G. E. WALTER.
LAWN TRIMMER.
APPLICATION FILED AUG. 28, 1913.
1,112,502.
Patented Oct. 6, 1914.
2 SHEETS—SHEET 2.
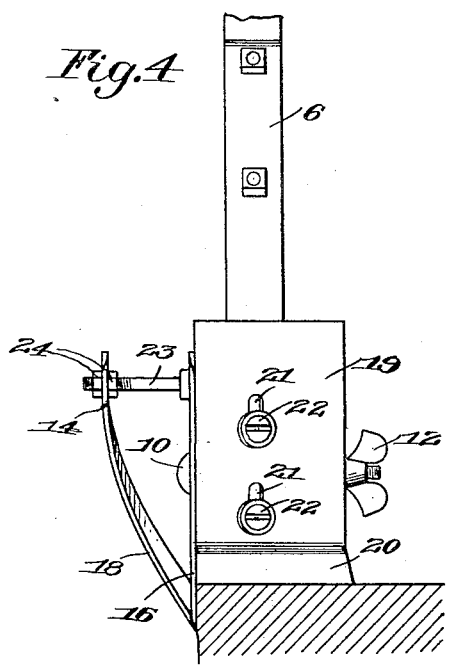
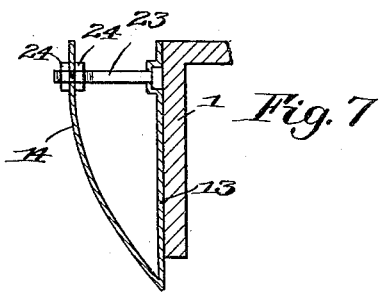
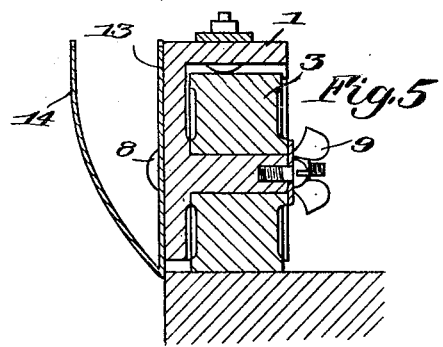
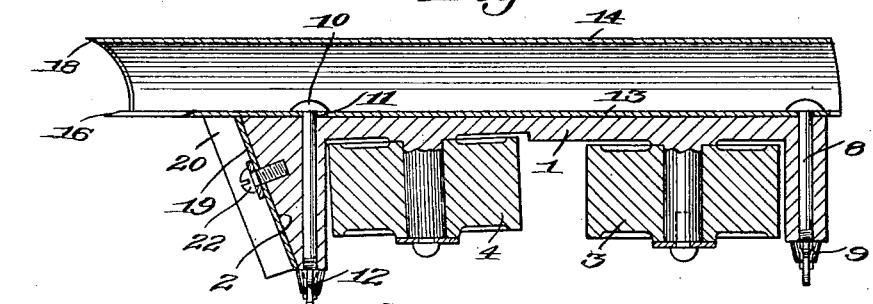
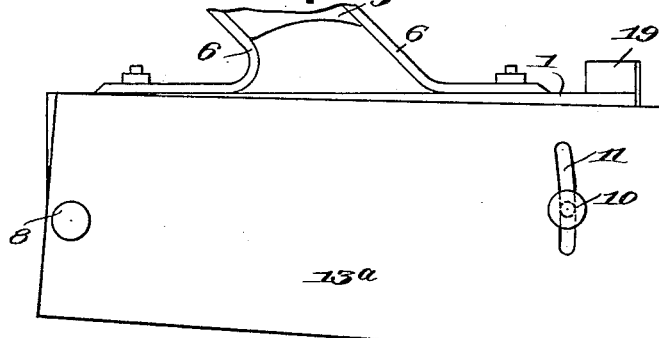
WITNESSES:
INVENTOR.
George E. Walter
BY
ATTORNEY

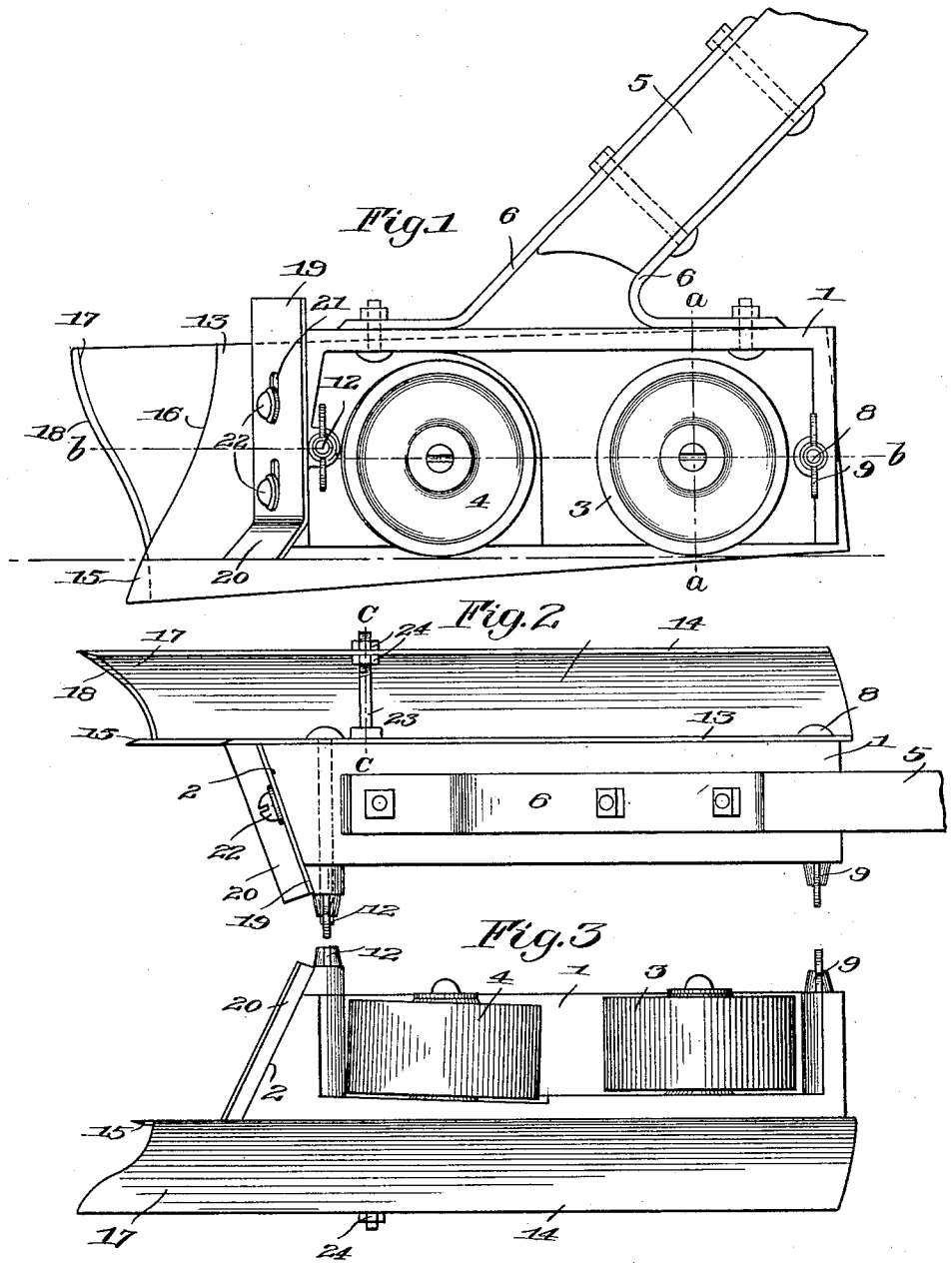

UNITED STATES PATENT OFFICE.

GEORGE E. WALTER, OF ROCHESTER, NEW YORK.

LAWN-TRIMMER.

1,112,502.

Specification of Letters Patent.

Patented Oct. 6, 1914.

Application filed August 28, 1913. Serial No. 787,165.

*To all whom it may concern:*

Be it known that I, GEORGE E. WALTER, of Rochester, in the county of Monroe and State of New York, have invented a new and useful Improvement in Lawn-Trimmers, which improvement is fully set forth in the following specification and shown in the accompanying drawings.

The present invention relates to lawn trimmers and routers for trimming the edge of a lawn and routing a small amount of the earth so as to improve the appearance of the lawn, and an object of this invention is to provide a construction which will dispose of the routed material in such a manner that no great impedance to the movement of the device will take place.

Another object of the invention is to provide for cutting grooves of different widths.

Another object of the invention is to provide for maintaining the depending cutter against the edge of the side walk so that the device will move in a line parallel with the edge of the side walk.

To these and other ends the invention consists in certain parts and combinations of parts all of which will be hereinafter described, the novel features being pointed out in the appended claims.

In the drawings: Figure 1 is a side view of the machine with a portion of the handle removed; Figs. 2 and 3 are respectively a top and bottom view of the machine; Fig. 4 is a front view; Fig. 5 is a section on the line *a—a*, Fig. 1; Fig. 6 is a horizontal section on the line *b—b*, Fig. 1; Fig. 7 is a vertical section on the line *c—c* of Fig. 2, and Fig. 8 is a side view showing the trimming and routing cutter replaced by a trimming cutter.

In the illustrated embodiment of the invention, there is provided a frame 1 of box-like form having its bottom wall and one of its side walls open and its front wall 2 beveled toward the open side wall. Within the frame are journaled two rollers or wheels 3 and 4. The rear wheel 3 turns in the plane of the frame 1 while the front wheel turns in the plane at a slight angle to the plane of the frame so that there is a tendency for the frame when moving forwardly to travel slightly to one side for holding the cutter to the edge of the sidewalk as will be described. The frame may be propelled in any suitable manner but preferably by a handle 5 which is rigidly secured by straps 6 to the upper wall of the frame.

The cutter is preferably in the form of a trough-shaped member which may be pivoted on a bolt 8 near the rear end of the frame 1, the bolt extending through the frame and being anchored by a thumb nut 9. At its forward end, the trough-shaped cutter may be guided on a bolt 10, being provided with an arc-shaped slot 11 which receives the head of the bolt, and the bolt having a thumb nut 12 which permits the loosening of the bolt in order that the forward end of the trough-shaped cutter may be raised and lowered. The trough-shaped cutter embodies a vertical wall 13 and a wall 14 which curves outwardly and upwardly from the lower edge of the vertical wall 13. The forward end of the vertical wall has a projection 15 extending beyond the lowermost portion of the curved wall 14 and having a gradually inclined uppermost edge 16. The curved wall 14 has a projection 17 at its upper end extending beyond the vertical wall 13 and having its lower edge gradually curving downwardly and rearwardly at 18. The forward edges of both walls are beveled to provide knife edges which will cut the grass. In order that the width of the cut of the trough-shaped member may be varied, an adjusting device may be employed for changing the distance between the wall 13 and 14, the metal springing at the bottom of the trough-shaped member to permit this adjustment. In the present instance, a bolt 23 is anchored in the wall 13 and extends through the wall 14, nuts 24 being arranged on the bolt on opposite sides of the wall 14 to hold the latter in its adjusted position.

Arranged on the beveled front wall 2 of the frame 1 is a scraper 19 having its lower portion turned outwardly at 20 and provided with a straight edge. This scraper is adjustable on the front wall so that the scraper may be made to project down to the lowermost portions of the wheels 3 and 4 in order to travel on and clear the surface on which the wheels travel, the upper portion of the scraper serving to deflect the material toward one side of the machine. The adjustment of the scraper may be effected in any suitable manner but preferably the scraper is provided with straight slots 21 in which operate bolts 22 anchored in the frame 1.

In some instances, it is desired merely to trim the edges of the lawn without routing the lawn and to this end the trough-shaped cutter may be removed and a trimming blade 13ᵃ employed which may be exactly like the wall 13 of the trough-shaped cutter.

In the use of the invention, the wheels 3 and 4 are caused to travel along the edge of a sidewalk or other surface in proximity to the margin of the lawn, and the trough-shaped cutter is adjusted so that its lower end projects downwardly below the lowermost portions of the wheels, the adjustment being made to correspond to the depth of the trench or ditch to be cut. The cutter is also adjusted to produce the desired width to the trench. Upon the forward movement of the tool, the projection 15, together with the knife edge formed on the forward end of the vertical wall 13, will cut the grass and dirt in proximity to the side wall, the upper inclined edge of the projection 16 serving to lift the material. The forward beveled edge of the curved wall 14 will dig the bottom of the trench and form also the opposite side wall of the trench, the inner face of the wall 14 projecting beyond the wall 13, acting as a mold board which turns the dirt over in advance of the wall 13 on the sidewalk, where it is caught and deflected to one side of the path of the machine by the scraper 19. The trough of the cutter beyond the forward end thereof performs no function other than acting as a support for the forward effective portions thereof as the dirt does not travel therethrough but, as before pointed out, is deflected laterally in advance of the carriage.

A trench cutter or ditcher constructed in accordance with this invention is durable in construction and simple in operation. The dirt removed from the trench or ditch is discharged in such a manner that it does not interfere with the operation of the tool and this method of discharge is believed to be novel. The cutter may be adjusted to cut trenches of various depths and widths.

What I claim as my invention and desire to secure by Letters Patent is:

1. A device of the class described comprising a wheeled carriage, and a trench cutter arranged to one side of the carriage depending below the wheels of the carriage and having a mold board arranged to discharge the material in advance of the wheeled carriage and in advance of the forward end of the trench cutter.

2. A device of the class described comprising a frame, a deflector at the forward portion of the frame, and a trench cutter arranged on one side of the frame and having a mold board arranged to discharge material in advance of the deflector to be carried by the latter to the opposite side of the frame out of the path of the frame.

3. A device of the class described comprising a frame, a deflector vertically adjustable on the front part of the frame, a trench cutter arranged on one side of the frame depending below the frame, and having a mold board arranged to discharge material in front of the deflector to be carried by the latter to the opposite side of the frame out of the path of the frame.

4. A device of the class described comprising a box-like frame open at its bottom and one of its side walls, wheels arranged in the frame, a deflector vertically adjustable on the front wall of the frame and having its lower edge acting as a scraper, a trough-shaped cutter pivoted near the rear portion of the frame, and means for adjustably securing the forward end of the trough-shaped cutter, said cutter having a mold board which turns the material in advance of the deflector to be carried by the latter to one side of the frame.

5. A device of the class described comprising a frame, a trench cutter depending below the frame at one side thereof, and a wheel arranged on the frame to operate in a plane at an acute angle to the line movement of the frame so that the depending cutter is held against the side walk and friction on the outer wall of the trench cutter is reduced.

6. A device of the class described comprising a frame, a wheel on the frame arranged to operate in a plane at an acute angle to the path of travel of the frame to cause the frame to move laterally when moving forwardly, and a cutter at one side of the frame and depending below the lowermost portion of the wheel.

7. A device of the class described comprising a frame, and a trench cutter adjustably mounted on one side of the frame to depend below the lowermost portion of the latter and having a mold board arranged to discharge the material laterally in advance of the frame and at the forward end of the trench cutter.

8. A device of the class described comprising a frame, and a trough-shaped cutter pivotally mounted on the frame to permit its forward end to be raised and lowered, the forward end of the trough-shaped cutter having its outer wall projecting beyond its inner wall and acting as a mold board to discharge in advance of the frame and a deflector arranged to carry the material out of the path of the frame.

9. A device of the class described comprising a frame, and a trough-shaped cutter carried by the frame and having a vertical inner wall provided with a projection at its lower forward edge extending beyond the proximate portion of the outer wall, and the outer wall being curved outwardly and upwardly and having a projection at its upper forward edge extending beyond the upper forward edge of the vertical wall.

10. A device of the class described comprising a frame, and a cutter blade arranged on one side of the frame pivoted at its rear end to the frame and having a forward edge in advance of the frame provided with a projection at the lower portion thereof, the top edge of said projection being inclined upwardly and rearwardly.

11. A device of the class described comprising a trough-shaped trench cutter formed from a single piece of material supported on one side of and depending below said frame and an adjusting device connecting the opposite walls of the cutter above the bottom of the latter to vary the distance between said walls.

GEORGE E. WALTER.

Witnesses:
FRANCES JACUBOURTZ,
HAROLD H. LIMMS.

Copies of this patent may be obtained for five cents each, by addressing the "Commissioner of Patents, Washington, D. C."